United States Patent [19]

Jäger

[11] Patent Number: 4,659,806
[45] Date of Patent: Apr. 21, 1987

[54] DISAZO COPPER COMPLEX REACTIVE DYESTUFFS

[75] Inventor: Horst Jäger, Leverkusen, Fed. Rep. of Germany

[73] Assignee: Bayer Aktiengesellschaft, Leverkusen, Fed. Rep. of Germany

[21] Appl. No.: 158,542

[22] Filed: Jun. 11, 1980

[30] Foreign Application Priority Data

Jun. 27, 1979 [DE] Fed. Rep. of Germany ....... 2925942

[51] Int. Cl.$^4$ .................... C09B 45/30; C09B 62/08; C09B 62/24
[52] U.S. Cl. .................................. 534/625; 534/617; 534/619; 534/620; 534/630; 534/633; 534/635; 534/637
[58] Field of Search ....................... 260/146 D, 146 T; 534/622, 625, 627

[56] References Cited

U.S. PATENT DOCUMENTS

| | | | |
|---|---|---|---|
| 3,336,284 | 8/1967 | Jager et al. | 260/154 |
| 3,711,460 | 1/1973 | Schundehutte | 260/146 D X |
| 4,049,704 | 9/1977 | Jager | 260/158 X |
| 4,128,544 | 12/1978 | Schneider | 260/146 D X |
| 4,219,472 | 8/1980 | Hurter | 260/146 T X |

FOREIGN PATENT DOCUMENTS

| | | | |
|---|---|---|---|
| 1444667 | 5/1973 | Fed. Rep. of Germany ... | 260/146 D |
| 1164019 | 9/1969 | United Kingdom ........... | 260/146 D |
| 1540604 | 2/1979 | United Kingdom ........... | 260/154 |

*Primary Examiner*—Charles F. Warren
*Attorney, Agent, or Firm*—Sprung Horn Kramer & Woods

[57] ABSTRACT

Copper complexes of disazo dyestuffs of the formula

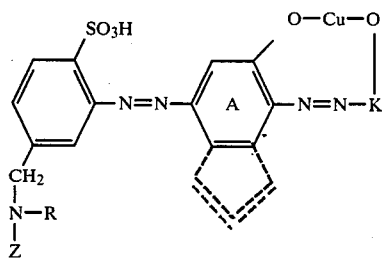

wherein R, Z, K and A have the meaning given in the description, and their use for dyeing and printing materials containing hydroxyl groups or amide groups, such as textile fibres, filaments and fabrics of wool, silk or synthetic polyamide or polyurethane fibres, and for dyeing and printing natural or regenerated cellulose in shades which are fast to washing.

4 Claims, No Drawings

DISAZO COPPER COMPLEX REACTIVE DYESTUFFS

The present invention relates to the copper complexes of disazo dyestuffs, of the formula

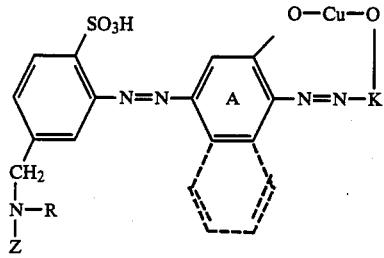

wherein
R denotes H or $C_1$–$C_4$-alkyl,
Z denotes a mono-, di- or tri-halogenopyrimidinyl radical or a mono- or di-halogenotriazinyl radical,
K denotes the radical of a 1-hydroxy- or 2-hydroxy-naphthalenesulfonic acid and the benzene or naphthalene nucleus A can contain further substituents, in particular chlorine atoms or $C_1$–$C_4$-alkyl, $C_1$–$C_4$-alkoxy or sulpho groups,
and to processes for their preparation.

R preferably represents $CH_3$.

Examples of radicals Z are the following: symmetric mono- or di-halogenotriazinyl radicals, for example 2,4-dichlorotriazin-6-yl, 2-amino-4-chlorotriazin-6-yl, 2-alkylamino-4-chlorotriazin-6-yl, such as 2-methylamino-4-chlorotriazin-6-yl, 2-ethylamino- or 2-propylamino-4-chlorotriazin-6-yl, 2-β-hydroxyethylamino-4-chlorotriazin-6-yl, 2-di-β-hydroxyethylamino-4-chlorotriazin-6-yl and the corresponding sulphuric acid half-esters, 2-diethylamino-4-chlorotriazin-6-yl, 2-morpholino- or 2-piperidino-4-chlorotriazin-6-yl, 2-cyclohexylamino-4-chlorotriazin-6-yl, 2-arylamino- and 2-substituted arylamino-4-chlorotriazin-6-yl, such as 2-phenylamino-4-chlorotriazin-6-yl, 2-(o-, m- or p-carboxy- or -sulpho-phenyl)-amino-4-chlorotriazin-6-yl, 2-alkoxy-4-chlorotriazin-6-yl, such as 2-methoxy- or -ethoxy-4-chlorotriazin-6-yl, 2-(phenylsulphonylmethoxy)-4-chlorotriazin-6-yl, 2-aryloxy- and 2-substituted aryloxy-4-chlorotriazin-6-yl, such as 2-phenoxy-4-chlorotriazin-6-yl, 2-(p-sulphophenyl)-oxy-4-chlorotriazin-6-yl and 2-(o-, m- or p-methyl- or -methoxy-phenyl)-oxy-4-chloro-triazin-6-yl, 2-alkylmercapto- or 2-arylmercapto- or 2-substituted arylmercapto-4-chlorotriazin-6-yl, such as 2-β-hydroxyethylmercapto-4-chlorotriazin-6-yl, 2-phenylmercapto-4-chlorotriazin-6-yl, 3-(4'-methylphenyl)-mercapto-4-chlorotriazin-6-yl and 2-(2',4'-dinitro)-phenylmercapto-4-chlorotriazin-6-yl, 2-methyl-4-chloro-triazin-6-yl, 2-phenyl-4-chloro-triazin-6-yl and 2,4-difluorotriazin-6-yl, monofluorotriazinyl radicals which are substituted by amino, alkylamino, aralkylamino or arylamino groups, alkyl denoting, in particular, optionally substituted $C_1$–$C_4$-alkyl, aralkyl denoting, in particular, optionally substituted phenyl-$C_1$–$C_4$-alkyl, and aryl denoting, in particular, phenyl or naphthyl which is optionally substituted by sulpho groups, alkyl groups, in particular $C_1$–$C_4$-alkyl, alkoxy groups, in particular $C_1$–$C_4$-alkoxy, carboxylic acid groups, acylamino groups or halogen atoms, such as fluorine, chlorine or bromine, examples of the monofluorotriazinyl radicals being 2-amino-4-fluoro-triazin-6-yl, 2-methylamino-4-fluorotriazin-6-yl, 2-ethylamino-4-fluoro-triazin-6-yl, 2-iso-propylamino-4-fluoro-triazin-6-yl, 2-dimethylamino-4-fluoro-triazin-6-yl, 2-diethylamino-4-fluoro-triazin-6-yl, 2-β-methoxyethylamino-4-fluoro-triazin-6-yl, 2-β-hydroxyethylamino-4-fluoro-triazin-6-yl, 2-di-(β-hydroxyethylamino)-4-fluoro-triazin-6-yl, 2-β-sulphoethylamino-4-fluoro-triazin-6-yl, 2-β-sulphoethyl-methylamino-4-fluoro-triazin-6-yl, 2-carboxymethylamino-4-fluoro-triazin-6-yl, 2-β-cyanoethylamino-4-fluoro-triazin-6-yl, 2-benzylamino-4-fluoro-triazin-6-yl, 2-β-phenylethylamino-4-fluoro-triazin-6-yl, 2-benzyl-methylamino-4-fluoro-triazin-6-yl, 2-(x-sulpho-benzyl)-amino-4-fluoro-triazin-6-yl, 2-cyclohexylamino-4-fluoro-triazin-6-yl, 2-(o-, m- or p-methylphenyl)-amino-4-fluoro-triazin-6-yl, 2-(o-, m- or p-sulphophenyl)-amino-4-fluoro-triazin-6-yl, 2-(2',5'-disulphophenyl)-amino-4-fluoro-triazin-6-yl, 2-(o-, m- or p-chlorophenyl)-amino-4-fluoro-triazin-6-yl, 2-(o-, m- or p-methoxyphenyl)-4-fluoro-triazin-6-yl, 2-(2'-methyl-4'-sulphophenyl)-amino-4-fluoro-triazin-6-yl, 2-(2'-methyl-5'-sulphophenyl)-amino-4-fluoro-triazin-6-yl, 2-(2'-chloro-4'-sulphophenyl)-amino-4-fluoro-triazin-6-yl, 2-(2'-chloro-5'-sulphophenyl)-amino-4-fluoro-triazin-6-yl, 2-(2'-methoxy-4'-sulphophenyl)-amino-4-fluorotriazin-6-yl, 2-(o-, m- or p-carboxyphenyl)-amino-4-fluoro-triazin-6-yl, 2-(2',4'-disulphophenyl)-amino-4-fluoro-triazin-6-yl, 2-(3',5'-disulphophenyl)-amino-4-fluoro-triazin-6-yl, 2-(2'-carboxy-4-sulphophenyl)-amino-4-fluoro-triazin-6-yl, 2-(6'-sulphonaphth-2'-yl)-amino-4-fluoro-triazin-6-yl, 2-(4',8'-disulphonaphth-2'-yl)-amino-4-fluoro-triazin-6-yl, 2-(6',8'-disulphonaphth-2'-yl)-amino-4-fluoro-triazin-6-yl, 2-(N-methylphenyl)-amino-4-fluoro-triazin-6-yl, 2-(N-ethylphenyl)-amino-4-fluoro-triazin-6-yl, 2-(N-β-hydroxyethylphenyl)-amino-4-fluoro-triazin-6-yl, 2-(N-iso-propylphenyl)-amino-4-fluoro-triazin-6-yl, 2-morpholino-4-fluorotriazin-6-yl, 2-piperidino-4-fluoro-triazin-6-yl, 2-(4',6',8'-trisulphonaphth-2'-yl)-4-fluoro-triazin-6-yl, 2-(3',6',8'-trisulphonaphth-2'-yl)-4-fluoro-triazin-6-yl and 2-(3',6'-disulphonaphth-1'-yl)-4-fluoro-triazin-6-yl, and mono-, di- or tri-halogenopyrimidinyl radicals, such as 2,4-dichloropyrimidin-6-yl, 2,4,5-trichloropyrimidin-6-yl, 2,4-dichloro-5-nitro- or -5-methyl- or -5-carboxymethyl- or -5-carboxy- or -5-cyano- or -5-vinyl- or -5-sulpho- or -5-mono-, -di- or -tri-chloromethyl- or -5-carbalkoxypyrimidin-6-yl, 2,6-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl and 2,4-dichloropyrimidine-5-sulphonyl, 2-chloroquinoxaline-3-carbonyl, 2- or 3-monochloroquinoxaline-6-carbonyl, 2- or 3-monochloroquinoxaline-6-sulphonyl, 2,3-dichloroquinoxaline-6-carbonyl, 2,3-dichloroquinoxaline-6-sulphonyl, 1,4-dichlorophthalazine-6-sulphonyl or -6-carbonyl, 2,4-dichloroquinazoline-7- or -6-sulphonyl or -carbonyl, 2-, 3- or 4-(4',5'-dichloropyridaz-6'-on-1'-yl)-phenyl-sulphonyl or -carbonyl, β-(4',5'-dichloropyridaz-6'-on-1'-yl)-ethylcarbonyl, N-methyl-N-(2,4-dichlorotriazin-6-yl)-carbamyl, N-methyl-N-(2-methylamino-4-chlorotriazin-6-yl)-carbamyl, N-methyl-N-(2-dimethylamino-4-chlorotriazin-6-yl)-carbamyl, N-methyl- or N-ethyl-N-(2,4-dichlorotrizin-6-yl)-aminoacetyl, N-methyl-N-(2,3-dichloroquinoxaline-6-sulphonyl)-amino-acetyl, N-methyl-N-(2,3-dichloroquinoxaline-6-carbonyl)- aminoacetyl, and the corresponding bromine and fluorine derivatives of the abovementioned chlorine-substituted heterocyclic radicals, and amongst these, for example, 2-fluoropyrimidin-4-yl, 2,6-difluoropyrimidin-4-yl, 2,6-difluoro-5-chloropyrimidin-4-yl, 2-fluoro-5,6-dichloropyrimidin-4-yl, 2,6-difluoro-5-methylpyrimidin-4-yl, 2,5-difluoro-6-methylpyrimidin-4-yl, 2-fluoro-5-methyl-6-chloropyrimidin-4-yl, 2-fluoro-5-nitro-6-chloropyrimidin-4-yl, 5-bromo-2-fluoropyrimidin-4-yl, 2-fluoro-5-cyanopyrimidin-4-yl, 2-fluoro-5-methylpyrimidin-4-yl, 2,5,6-trifluoropyrimidin-4-yl, 5-chloro-6-chloromethyl-2-fluoropyrimidin-4-yl, 2,6-difluoro-5-bromopyrimidin-4-yl, 2-fluoro-5-bromo-6-methylpyrimidin-4-yl, 2-fluoro-5-bromo-6-chloromethylpyrimidin-4-yl, 2,6-difluoro-5-chloromethylpyrimidin-4-yl, 2,6-difluoro-5-nitropyrimidin-4-yl, 2-fluoro-6-methylpyrimidin-4-yl, 2-fluoro-5-chloro-6-methylpyrimidin-4-yl, 2-fluoro-5-chloropyrimidin-b 4-yl, 2-fluoro-6-chloropyrimidin-4-yl, 6-trifluoromethyl-5-chloro-2-fluoropyrimidin-4-yl, 6-trifluoromethyl-2-fluoropyrimidin-4-yl, 2-fluoro-5-nitropyrimidin-4-yl, 2-fluoro-5-trifluoromethylpyrimidin-4-yl, 2-fluoro-5-phenyl- or -5-methylsulphonylpyrimidin-4-yl, 2-fluoro-5-carboxamidopyrimidin-4-yl, 2-fluoro-5-carbomethoxypyrimidin-4-yl, 2-fluoro-5-bromo-6-trifluoromethylpyrimidin-4-yl, 2-fluoro-6-carboxamidopyrimidin-4-yl, 2-fluoro-6-carbomethoxypyrimidin-4-yl, 2-fluoro-6-phenylpyrimidin-4-yl, 2-fluoro-6-cyanopyrimidin-4-yl, 2,6-difluoro-5-methylsulphonylpyrimidin-4-yl, 2-fluoro-5-sulphonamidopyrimidin-4-yl, 2-fluoro-5-chloro-6-carbomethoxypyrimidin-4-yl and 2,6-difluoro-5-trifluoromethylpyrimidin-4-yl.

Examples of benzene or naphthalene nuclei A are the following: 1-amino-2-methoxy-benzene (demethylating cooperating), 1-amino-2-methoxy-5-methyl-benzene (demethylating coppering), 1-amino-2,5-dimethoxy-benzene (demethylating coppering) and 1-amino-6- or -7-sulphonaphthaalene (oxidative coppering).

Examples of suitable coupling components

are: 1-hydroxy-5-sulpho-naphthalene, 1-hydroxy-3,6-disulphonaphthalene, 1-hydroxy-3,7-disulpho-naphthalene, 1-hydroxy-3,8-disulpho-naphthalene, 1-hydroxy-4,6-disulpho-naphthalene, 1-hydroxy-4,7-disulpho-naphthalene, 1-hydroxy-4,8-disulpho-naphthalene, 1-hydroxy-3,5-disulpho-naphthalene, 2-hydroxy-3,6-disulpho-naphthalene, 2-hydroxy-5,7-disulpho-naphthalene, 2-hydroxy-5-, -6- or -7-sulpho-naphthalene and 1-hydroxy-4-sulphonaphthalene.

Preferred dyestuffs correspond to the formula

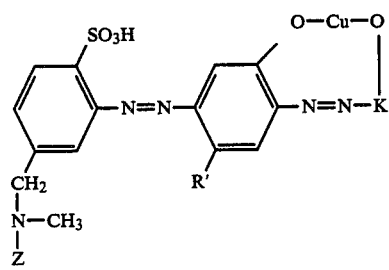

wherein R' denotes H or CH₃, or the formula

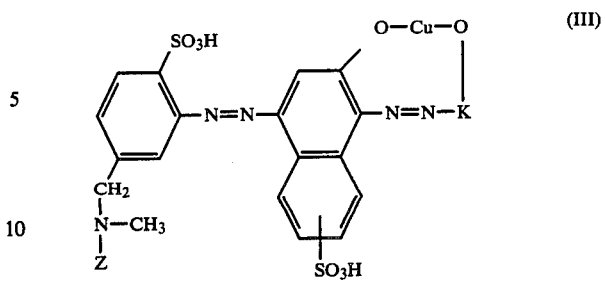

and to the formulae I–III in which Z denotes 2-fluoro-5,6-dichloro-pyrimidin-4-yl, 2,6-difluoro-5-chloro-pyrimidin-4-yl, 2-fluoro-4-amino-triazin-4-yl, 2-fluoro-4-metjhylaminotriazin-4-yl, 2-fluoro-4-(2'-, 3'- or 4'-sulphophenylamino)-triazin-4-yl, 2-fluoro-4-(2'-methyl-4'- or -5'-sulphophenylamino)-triazin-4yl, 2-fluoro-4-(2'-chloro-4'- or -5'-sulphophenylamino)-triazin-4-yl and 2-fluoro-4-(2'-sulpho-4'-methoxyphenylamino)-triazin-4-yl.

The dyestuffs of the formula (I) can be prepared by acylating dyestuffs of the formula

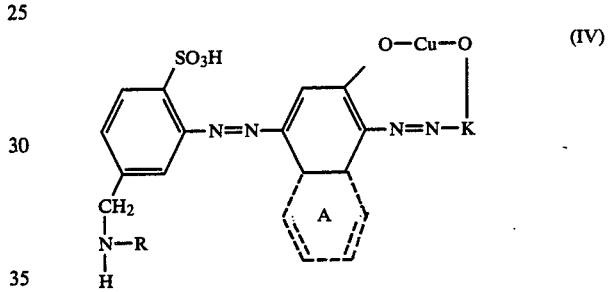

with reactive components

wherein Y denotes a substituent which can be split off as an anion.

The reaction temperatures can vary between, for example, 0° and 80°, depending on the reactivity of the reactive component Y-Z. The reaction is advantageously carried out in a weakly alkaline to neutral range. The preferred pH value is between 7 and 9.

Examples of reactive components of the formula V which are suitable for this reaction are those on which the abovementioned reactive groups are based, that is to say in general the halides, and in particular the chlorides, of the acyl components Z mentioned. Of the large number of compounds available, the following may be mentioned here as examples: symmetric trihalogenotriazines, such as cyanuric chloride and cyanuric bromide, and symmetric dihalogeno-monoamino- and -mono-substituted amino-triazines, such as 2,6-dichloro-4-aminotriazine, 2,6-dichloro-4-methylaminotriazine, 2,6-dichloro-4-ethylaminotriazine, 2,6-dichloro-4-hydroxyethylaminotrizine, 2,6-dichloro-4-phenylaminotriazine, 2,6-dichloro-4-(2',3+-,2',4'-, 3',4'- or 3',5'-disulphophenyl)-aminotriazine, symmetric dihalogeno-alkoxy- and -aryloxy-triazines, such as 2,6-dichloro-4-methoxytriazine, 2,6-dichloro-4-ethoxytriazine, 2,6-dichloro-4-phenoxytriazine and 2,6-dichloro-4-(o-, m- or p-sulphophenyl)-oxytriazine, symmetric dihalogeno-alkylmercapto- and -arylmercapto-triazines, such as 2,6-dichloro-4-ethylmercapto-triazine, 2,6- dichloro-4-phenylmercaptotriazine and 2,6-dichloro-4-(p-methylphenyl)-mercaptotriazine, 2,4,6-trifluorotriazine, 2,4-fluoro-6-(o-, m- or p-methyl-phenyl)-aminotriazine, 2,4-difluoro-6-(o-, m- or p-sulphophenyl)-amino-triazine, 2,4-difluoro-6-methoxy-triazine, 2,4-difluoro-6-(2',5'-disulphophenyl)-amino-triazine, 2,4-difluoro-6-(6'-sulphonaphth-2'-yl)-amino-triazine, 2,4-difluoro-6-(o-, m- or p-ethylphenyl)-amino-triazine, 2,4-difluoro-6-(o-, m- or p-chlorophenyl)-amino-triazine, 2,4-difluoro-6-(o-, m- or p-methoxyphenyl)-amino-triazine, 2,4-difluoro-6-(2'-methyl-5'-sulphophenyl)-aminotriazine, 2,4-difluoro-6-(2'-methyl-4'-sulphophenyl)-amino-triazine, 2,4-difluoro-6-(2'-chloro-4'-sulphophenyl)-amino-triazine, 2,4-difluoro-6-(2'-chloro-5'-sulphophenyl)-amino-triazin, 2,4-difluoro-6-(2'-methoxy-4'-sulphophenyl)-amino-triazine, 2,4-difluoro-6-(o-, m- or p-carboxyphenyl)-amino-triazine, 2,4-difluor-6-(N-methyl-phenyl)-amino-triazine, 2,4-difluoro-6-(N-ethylphenyl)-amino-triazine, 2,4-difluoro-6-(N-isopropylphenyl)-amino-triazine, 2,4-difluoro-6-cyclohexylamino-triazine, 2,4-difluoro-6-morpholino-triazine, 2,4-difluoro-6-piperidino-triazine, 2,4-difluoro-6-benzylamino-triazine, 2,4-difluoro-6-N-methyl-benzylamino-triazine, 2,4-difluoro-6-β-phenylethylaminotriazin, 2,4-difluoro-6-(X-sulpho-benzyl)-amino-triazine, 2,4-difluoro-6-(2',4'-disulphophenyl)-amino-triazine, 2,4-difluoro-6-(3',5'-disulphophenyl)-amino-triazine, 2,4-difluoro-6-(2'-carboxy-4'-sulpho-phenyl)-amino-triazine, 2,4-difluoro-6-(2',5'-disulpho-4-methoxyphenyl)-amino-triazine, 2,4-difluoro-(2'-methyl-4',6'-disulphophenyl)-amino-triazine, 2,4-difluoro-(6',8'-disulphonaphth-2'-yl)-amino-triazine, 2,4-difluoro-(4',8'-disulphonaphth-2'-yl)-amino-triazine, 2,4-difluoro-(4',6',8'-trisulpho-naphth-2'-yl)-amino-triazine, 2,4-difluoro-(3',6',8'-trisulphonaphth-2'-yl)-amino-triazine, 2,4-difluoro-(3',6'-disulphonaphth-1'-yl)-aminotriazine, 2,4-difluoro-6-amino-triazine, 2,4-difluoro-6-methylamino-triazine, 2,4-difluoro-6-ethylamino-triazine, 2,4-difluoro-6-methoxyethoxy-triazine, 2,4-difluoro-6-methoxyethylamino-triazine, 2,4-difluoro-6-dimethylamino-triazine, 2,4-difluoro-6-diethylaminotriazine, 2,4-difluoro-6-iso-propylamino-triazine and tetrahalogenopyrimidines, such as tetrachloro-, tetrabromo- or tetrafluoro-pyrimidine, 2,4,6-trihalogenopyrimidines, such as 2,4,6-trichloro-, -tribromo- or -trifluoro-pyrimidine, dihalogenopyrimidines, such as 2,4-dichloro-, -dibromo- or -difluoropyrimidines; and 2,4,6-trichloro-5-nitro- or -5-methyl- or -5-carbomethoxy- or -5-carbethoxy- or -5-carboxymethyl- or -5-mono-, -di- or -tri-chloromethyl- or -5-carboxy- or -5-sulpho- or -5-cyano- or -5-vinyl-pyridine, 2,4-difluoro-6-methylpyrimidine, 2,6-difluoro-4-methyl-5-chloropyrimidine, 2,4-difluoro-pyrimidin-5-yl ethyl sulphone, 2,6-difluoro-4-cjloro-pyrimidine, 2,4,6-trifluoro-5-chloropyrimidine, 2,6-difluoro-4-methyl-5-bromopyrimidine, 2,4-difluoro-5,6-dichloro- or -dibromo-pyrimidine, 4,6-difluoro-2,5-dichloro- or -dibromo-pyrimidine, 2,6-difluoro-4-bromopyrimidine, 2,4,6-trifluoro-5-bromopyrimidine, 2,4,6-trifluoro-5-chloromethylpyrimidine, 2,4,6-trifluoro-5-nitropyrimidine, 2,4,6-trifluoro-5-cyanopyrimidine, 2,4,6-trifluoropyrimidine-5-carboxylic acid alkyl esters or -5-carboxylic acid amides, 2,6-difluoro-5-methyl-4-chloropyrimidine, 2,6-difluoro-5-chloropyrimidine, 2,4,6-trifluoro-5-methylpyrimidine, 2,4,5-trifluoro-6-methylpyrimidine, 2,4-difluoro-5-nitro-6-chloropyrimidine, 2,4-difluoro-5-cyanopyrimidine, 2,4-difluoro-5-methyl-pyrimidine, 6-trifluoromethyl-5-chloro-2,4-difluoropyrimidine, 6-phenyl-2,4-difluoropyrimidine, 6-trifluoromethyl-2,4-difluoropyrimidine, 5-trifluoromethyl-2,4,6-trifluoropyrimidine, 2,4-difluoro-5-nitro-pyrimidine, 2,4-difluoro-5-trifluoro-methylpyrimidine, 2,4-difluoro-5-methylsulphonylpyrimidine, 2,4-difluoro-5-phenyl-pyrimidine, 2,4-difluoro-5-carboxamido-pyrimidine, 2,4-difluoro-5-carbomethoxy-pyrimidine, 2,4-difluoro-6-trifluoromethyl-pyrimidine, 2,4-difluoro-6-carboxamido-pyrimidine, 2,4-difluoro-6-carbomethoxypyrimidine, 2,4-difluoro-6-phenyl-pyrimidine, 2,4-difluoro-6-cyanopyrimidine, 2,4,6-trifluoro-5-methylsulphonyl-pyrimidine, 2,4-difluoro-5-sulphonamido-pyrimidine, 2,4-difluoro-5-chlorocarbomethoxy-pyrimidine, 5-trifluoromethyl-2,4-difluoropyrimidine, 2,4-dichloropyrimidine-5-carboxylic acid chloride, 2,4,6-trichloropyrimidine-5-carboxylic acid chloride, 2-methyl-4-chloropyrimidine-5-carboxylic acid chloride, 2-chloro-4-methylpyrimidine-5-carboxylic acid chloride and 2,6-dichloropyrimidine-4-carboxylic acid chloride.

The new dyestuffs are suitable for dyeing and printing materials containing hydroxyl groups or amide groups, such as textile fibres, filaments and fabrics of wool, silk or synthetic polyamide or polyurethane fibres, and for dyeing and printing natural or regenerated cellulose in shades which are fast to washing, the treatment of cellulose materials appropriately being carried out in the presence of acid-binding agents and if appropriate by the action of heat, in accordance with the processes disclosed for reactive dyestuffs.

The formulae given for the dyestuffs are those of the corresponding free acids. The dyestuffs are in general isolated and used for dyeing in the form of their alkali metal salts, in particular their Na salts.

EXAMPLE 1

72.7 g of the aminodisazo dyestuff of the formula

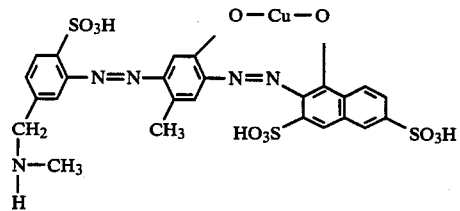

are stirred in 600 ml of water at 15° C. and at pH 7. 16.9 g of 2,4,6-trifluoro-5-chloropyrimidine are added dropwise in the course of ½ hour, during which the pH is kept between 8 and 9 by adding dilute sodium hydroxide solution. The dyestuff dissolves during the acylation. After proof, by means of a thin layer chromatogram, that the reaction has ended, the dyestuff is salted out and filtered off. After drying at 70° in vacuo and then grinding, a dark powder is obtained which dissolves in water giving a blue-coloured solution and dyes cotton and fibres of regenerated cellulose, by one of the application processes customary for reactive dyestuffs, in navy blue shades of very good fastness to light and wet processing. The dyestuff can be discharged.

The starting dyestuff is obtained by selectively acetylating the aliphatic amino group of 1-amino-2-sulpho-5-N-methylaminomethyl-benzene with acetic anhydride in an aqueous phase at 0° and at pH 8.5-9.5. The diazo compound is prepared from this acylation product and is coupled with 1-amino-2-methoxy-5-methylbenzene in a weakly acid medium. The resulting aminoazo dyestuff is diazotised and the diazotisation product is coupled to 1-hydroxy-3,6-disulpho-naphthalene in an alkaline range, obtained with bicarbonate. The disazo dyestuff is then subjected to dimethylating coppering. The copper-containing aminodisazo dyestuff is obtained after saponification of the acetylamino group by warming the coppered product with sodium hydroxide solution.

Dyestuffs with similar properties are likewise obtained by the procedure of this example if one of the middle components listed in column 1 is used instead of 1-amino-2-methoxy-5-methyl-benzene, one of the end components mentioned in column 2 is used instead of 1-hydroxy-3,6-disulpho-naphthalene and one of the reactive components described in column 3 is used instead of 2,4,6-trifluoro-5-chloro-pyrimidine.

| Example | Middle component | End component | Reactive component |
|---|---|---|---|
| 2 | 1-Amino-2-methoxy-5-methyl-benzene | 1-Hydroxy-3,6-disulpho-naphthalene | 2,4-Difluoro-5,6-dichloro-pyrimidine |
| 3 | 1-Amino-2-methoxy-5-methyl-benzene | 1-Hydroxy-3,6-disulpho-naphthalene | 2,4,5,6-Tetrachloro-pyrimidine |
| 4 | 1-Amino-2-methoxy-5-methyl-benzene | 1-Hydroxy-3,6-disulpho-naphthalene | 2-Methylsulphonyl-4,5-dichloro-6-methyl-pyrimidine |
| 5 | 1-Amino-2-methoxy-5-methyl-benzene | 1-Hydroxy-3,6-disulpho-naphthalene | 2-Amino-4,6-difluoro-triazine |
| 6 | 1-Amino-2-methoxy-5-methyl-benzene | 1-Hydroxy-3,6-disulpho-naphthalene | 2-Methylamino-4,6-difluoro-triazine |
| 7 | 1-Amino-2-methoxy-5-methyl-benzene | 1-Hydroxy-3,6-disulpho-naphthalene | 2-Phenylamino-4,6-difluoro-triazine |
| 8 | 1-Amino-2-methoxy-5-methyl-benzene | 1-Hydroxy-3,6-disulpho-naphthalene | 2-(3'-Sulphophenylamino)-4,6-difluoro-triazine |
| 9 | 1-Amino-2-methoxy-5-methyl-benzene | 1-Hydroxy-3,6-disulpho-naphthalene | 2-(4'-Sulphophenylamino)-4,6-difluoro-triazine |
| 10 | 1-Amino-2-methoxy-5-methyl-benzene | 1-Hydroxy-3,6-disulpho-naphthalene | 2-(2'-Methyl-5'-sulphophenyl-amino)-4,6-difluorotriazine |
| 11 | 1-Amino-2-methoxy-5-methyl-benzene | 1-Hydroxy-3,6-disulpho-naphthalene | 2-(2'-Chloro-4'-sulphophenyl-amino)-4,6-difluorotriazine |
| 12 | 1-Amino-2-methoxy-5-methyl-benzene | 1-Hydroxy-3,6-disulpho-naphthalene | 2-(2'-Sulpho-4'-methoxyphenyl-amino)-4,6-difluorotriazine |
| 13 | 1-Amino-2-methoxy-5-methyl-benzene | 1-Hydroxy-3,6-disulpho-naphthalene | 2-(2'-sulpho-phenylamino)-4,6-difluoro-triazine |
| 14 | 1-Amino-2-methoxy-5-methyl-benzene | 1-Hydroxy-3,6-disulpho-naphthalene | 2-(6'-Sulphonaphthylamino)-4,6-difluoro-triazine |
| 15 | 1-Amino-2-methoxy-5-methyl-benzene | 1-Hydroxy-3,6-disulpho-naphthalene | 2-Methoxyethoxy-4,6-difluoro-triazine |
| 16 | 1-Amino-2-methoxy-5-methyl-benzene | 1-Hydroxy-3,6-disulpho-naphthalene | 2-Amino-4,6-dichloro-triazine |
| 17 | 1-Amino-2-methoxy-5-methyl-benzene | 1-Hydroxy-3,6-disulpho-naphthalene | 2-Methylamino-4,6-dichloro-triazine |
| 18 | 1-Amino-2-methoxy-5-methyl-benzene | 1-Hydroxy-3,6-disulpho-naphthalene | 2-Phenylamino-4,6-dichloro-triazine |
| 19 | 1-Amino-2-methoxy-5-methyl-benzene | 1-Hydroxy-3,6-disulpho-naphthalene | 2-(3'-Sulphophenylamino)-4,6-dichloro-triazine |
| 20 | 1-Amino-2-methoxy-5-methyl-benzene | 1-Hydroxy-3,6-disulpho-naphthalene | 2-(4'-Sulphophenylamino)-4,6-dichloro-triazine |
| 21 | 1-Amino-2-methoxy-5-methyl-benzene | 1-Hydroxy-3,6-disulpho-naphthalene | 2-(2'-Methyl-5'-sulphophenyl-amino)-4,6-dichloro-triazine |
| 22 | 1-Amino-2-methoxy-5-methyl-benzene | 1-Hydroxy-3,6-disulpho-naphthalene | 2-N—Methylphenylamino-4,6-dichloro-triazine |
| 23 | 1-Amino-2-methoxy-5-methyl-benzene | 1-Hydroxy-4,8-disulpho-naphthalene | 2,4,6-Trifluoro-5-chloro-pyrimidine |
| 24 | 1-Amino-2-methoxy-5-methyl-benzene | 1-Hydroxy-4,8-disulpho-naphthalene | 2,4-Difluoro-5,6-dichloro-pyrimidine |
| 25 | 1-Amino-2-methoxy-5-methyl-benzene | 1-Hydroxy-4,8-disulpho-naphthalene | 2-Amino-4,6-difluorotriazine |
| 26 | 1-Amino-2-methoxy-5-methyl-benzene | 1-Hydroxy-4,8-disulpho-naphthalene | 2-(3'-Sulphophenylamino)-4,6-difluoro-triazine |
| 27 | 1-Amino-2-methoxy-5-methyl-benzene | 1-Hydroxy-4,8-disulpho-naphthalene | 2-(4'-Sulphophenylamino)-4,6-difluoro-triazine |
| 28 | 1-Amino-2-methoxy-5-methyl-benzene | 1-Hydroxy-4,8-disulpho-naphthalene | 2-(2'-Methyl-5'-sulphophenyl-amino)-4,6-difluorotriazine |
| 29 | 1-Amino-2-methoxy-5-methyl-benzene | 1-Hydroxy-4,8-disulpho-naphthalene | 2-(2'-Chloro-4'-sulphophenyl-amino)-4,6-difluorotriazine |
| 30 | 1-Amino-2-methoxy-5-methyl-benzene | 1-Hydroxy-4,7-disulpho-naphthalene | 2,4,6-Trifluoro-5-chloro-pyrimidine |
| 31 | 1-Amino-2-methoxy-5-methyl-benzene | 1-Hydroxy-4,7-disulpho-naphthalene | 2-(2'-Sulphophenylamino)-4,6-difluoro-triazine |
| 32 | 1-Amino-2-methoxy-5-methyl-benzene | 1-Hydroxy-4,7-disulpho-naphthalene | 2-(3'-Sulphophenylamino)-4,6-difluoro-triazine |
| 33 | 1-Amino-2-methoxy-5-methyl-benzene | 1-Hydroxy-5-sulpho-naphthalene | 2-(2'-Sulphophenylamino)-4,6-difluoro-triazine |
| 34 | 1-Amino-2-methoxy-5-methyl-benzene | 1-Hydroxy-4-sulpho-naphthalene | 2-(2'-Sulphophenylamino)-4,6-difluoro-triazine |
| 35 | 1-Amino-2-methoxy-5-methyl-benzene | 2-Hydroxy-3,6-disulpho-naphthalene | 2-Amino-4,6-difluorotriazine |
| 36 | 1-Amino-2-methoxy- | 2-Hydroxy-5,7-disulpho- | 2-Amino-4,6-difluorotriazine |

| Example | Middle component | End component | Reactive component |
|---|---|---|---|
| | 5-methyl-benzene | naphthalene | |

EXAMPLE 37

84,3 g of the aminodisazo dyestuff of the formula

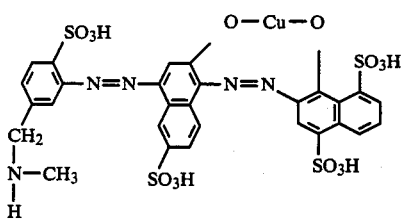

are stirred in 600 ml of water at 15° C. and at pH 7. 16.9 g of 2,4,6-trifluoro-5-chloropyrimidine are added dropwise in the course of ½ hour, during which the pH is kept between 8 and 9 by adding dilute sodium hydroxide solution. The dyestuff dissolves during the acylation. After proof, by means of a thin layer chromatogram, that the reaction has ended, the dyestuff is salted out and filtered off. After drying at 70° C. in vacuo and then grinding, a dark powder is obtained which dissolves in water giving a blue-coloured solution and dyes cotton and fibres of regenerated cellulose, by one of the application processes customary for reactive dyestuffs, in greenish-tinged blud shades of very good fastness to light and wet processing. The dyestuff can be discharged.

The starting dyestuff is obtained by selectively acetylating the aliphatic amino group of 1-amino-2-sulpho-5-N-methylaminomethyl-benzene with acetic anhydride in an aqueous phase at 0° and at pH 8.5–9.5. The diazo compound is prepared from this acylation product and is coupled with 1-amino-6-sulpho-naphthalene in a weakly acid medium. The resulting aminoazo dyestuff is diazotised and the diazotisation product is coupled to 1-hydroxy-4,8-disulphonaphthalene in an alkaline range, obtained with bicarbonate. The disazo dyestuff is then subjected to oxidative coppering. The copper-containing aminodisazo dyestuff is obtained after saponification of the acetylamino group by warming the coppered product with sodium hydroxide solution.

Dyestuffs with similar properties are likewise obtained by the procedure of this example if one of the end components mentioned in column 2 is used instead of 1-hydroxy-3,6-disulpho-naphthalene and one of the reactive components described in column 3 is used instead of 2,4,6-trifluoro-5-chloro-pyrimidine.

| Example | End component | Reactive component |
|---|---|---|
| 38 | 1-Hydroxy-3,6-disulpho-naphthalene | 2,4-Difluoro-5,6-dichloro-pyrimidine |
| 39 | 1-Hydroxy-3,6-disulpho-naphthalene | 2,4,5,6-Tetrachloro-pyrimidine |
| 40 | 1-Hydroxy-3,6-disulpho-naphthalene | 2-Methylsulphonyl-4,5-dichloro-6-methyl-pyrimidine |
| 41 | 1-Hydroxy-3,6-disulpho-naphthalene | 2-Amino-4,6-difluoro-triazine |
| 42 | 1-Hydroxy-3,6-disulpho-naphthalene | 2-Methylamino-4,6-difluoro-triazine |
| 43 | 1-Hydroxy-3,6-disulpho-naphthalene | 2-Phenylamino-4,6-difluoro-triazine |
| 44 | 1-Hydroxy-3,6-disulpho-naphthalene | 2-(3'-Sulphophenylamino)-4,6-difluoro-triazine |
| 45 | 1-Hydroxy-3,6-disulpho-naphthalene | 2-(4'-Sulphophenylamino)-4,6-difluoro-triazine |
| 46 | 1-Hydroxy-3,6-disulpho-naphthalene | 2-(2'-Methyl-5'-sulphophenyl-amino)-4,6-difluorotriazine |
| 47 | 1-Hydroxy-3,6-disulpho-naphthalene | 2-(2'-Chloro-4'-sulphophenyl-amino)-4,6-difluorotriazine |
| 48 | 1-Hydroxy-3,6-disulpho-naphthalene | 2-(2'-Sulpho-4'-methoxyphenyl-amino)-4,6-difluorotriazine |
| 49 | 1-Hydroxy-3,6-disulpho-naphthalene | 2-(2'-Sulpho-phenylamino)-4,6-difluorotriazine |
| 50 | 1-Hydroxy-3,6-disulpho-naphthalene | 2-(6'-Sulphonaphthylamino)-4,6-difluorotriazine |
| 51 | 1-Hydroxy-3,6-disulpho-naphthalene | 2-Methoxyethoxy-4,6-difluoro-triazine |
| 52 | 1-Hydroxy-3,6-disulpho-naphthalene | 2-Amino-4,6-dichloro-triazine |
| 53 | 1-Hydroxy-3,6-disulpho-naphthalene | 2-Methylamino-4,6-dichloro-triazine |
| 54 | 1-Hydroxy-3,6-disulpho-naphthalene | 2-Phenylamino-4,6-dichloro-triazine |
| 55 | 1-Hydroxy-3,6-disulpho-naphthalene | 2-(3'-Sulphophenylamino)-4,6-dichloro-triazine |
| 56 | 1-Hydroxy-3,6-disulpho-naphthalene | 2-(4'-Sulphophenylamino)-4,6-dichloro-triazine |
| 57 | 1-Hydroxy-3,6-disulpho-naphthalene | 2-(2'-Methyl-5'-sulphophenyl-amino)-4,6-dichloro-triazine |
| 58 | 1-Hydroxy-3,6-disulpho-naphthalene | 2-N—Methylphenylamino-4,6-dichloro-triazine |
| 59 | 1-Hydroxy-3,6-disulpho-naphthalene | 2,4,6-Trifluoro-5-chloro-pyrimidine |

-continued

| Example | End component | Reactive component |
|---|---|---|
| 60 | 1-Hydroxy-4,8-disulpho-naphthalene | 2,4-Difluoro-5,6-dichloro-pyrimidine |
| 61 | 1-Hydroxy-4,8-disulpho-naphthalene | 2-Amino-4,6-difluorotriazine |
| 62 | 1-Hydroxy-4,8-disulpho-naphthalene | 2-(3'-Sulphophenylamino)-4,6-difluorotriazine |
| 63 | 1-Hydroxy-4,8-disulpho-naphthalene | 2-(4'-Sulphophenylamino)-4,6-difluorotriazine |
| 64 | 1-Hydroxy-4,8-disulpho-napthalene | 2-(2'-Methyl-5'-sulphophenyl-amino)-4,6-difluorotriazine |
| 65 | 1-Hydroxy-4,8-disulpho-naphthalene | 2-(2'-Chloro-4'-sulphophenyl-amino)-4,6-difluorotriazine |
| 66 | 1-Hydroxy-4,7-disulpho naphthalene | 2,4,6-Trifluoro-5-chloro-pyrimidine |
| 67 | 1-Hydroxy-4,7-disulpho naphthalene | 2-(2'-Sulphophenylamino)-4,6-difluorotriazine |
| 68 | 1-Hydroxy-4,7-disulpho naphthalene | 2-(3'-Sulphophenylamino)-4,6-difluorotriazine |
| 69 | 1-Hydroxy-5-sulpho-naphthalene | 2-(2'-Sulphophenylamino)-4,6-difluorotriazine |
| 70 | 1-Hydroxy-4-sulpho-naphthalene | 2-(2'-Sulphophenylamino)-4,6-difluorotriazine |
| 71 | 2-Hydroxy-3,6-disulpho-naphthalene | 2-Amino-4,6-difluorotriazine |
| 72 | 2-Hydroxy-5,7-disulpho-naphthalene | " |

EXAMPLE 73

91.4 g of the disazo dyestuff of the formula

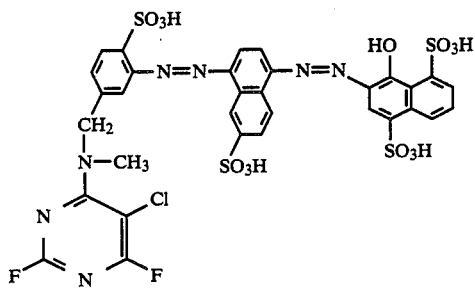

are dissolved in 1,000 ml of water. 28 g of CuSO$_4$.5H$_2$O and 42 g of NaAc.3H$_2$O are added, and a 3% strength H$_2$O$_2$ solution is added dropwise until the thin layer chromatogram indicates the end of the oxidative coppering. The dyestuff is salted out with sodium chloride, filtered off and dried. After grinding, a dark powder, which dissolves in water giving a greenish-tinged blue-coloured solution, is obtained. Using this dyestuff, greenish-tinged blue dyeings of good fastness to light and wet processing are obtained on cotton by one of the application processes customary for reactive dyestuffs. The dyestuff can be discharged.

The dyestuff is identical to the dyestuff prepared according to Example 37.

The starting dyestuff is obtained by selectively acylating the aliphatic amino group of 1-amino-2-sulpho-5-methylamino-methylbenzene with 2,4,6-trifluoro-5-chloro-pyrimidine in an aqueous phase at 0° and at pH 8.5-8.7. The diazo compound is prepared from this acylation product and is coupled with 1-amino-6-sulphonaphthalene in a weakly acid medium. The resulting aminoazo dyestuff is diazotised and the diazotisation product is coupled to 1-hydroxy-4,8-disulpho-naphthalene in an alkaline medium, obtained with bicarbonate.

I claim:

1. Copper complexes of disazo dyestuffs, of the formula

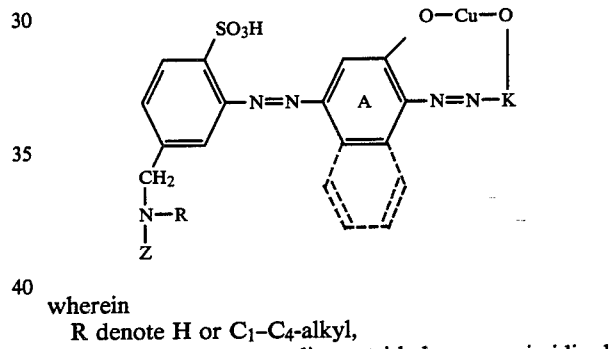

wherein
R denote H or C$_1$-C$_4$-alkyl,
Z denotes a mono-, di- or tri-halogenopyrimidinyl radical or a mono- or di-halogenotriazinyl radical,
K denotes the radical of a 1-hydroxy- or 2-hydroxy-naphthalenesulfphonic acid and the benzene or naphthalene nucleus A can contain further substituents, in particular chlorine atoms or C$_1$-C$_4$-alkyl, C$_1$-C$_4$-alkoxy or sulpho groups.

2. Copper complexes of disazo dyestuffs, of the formula

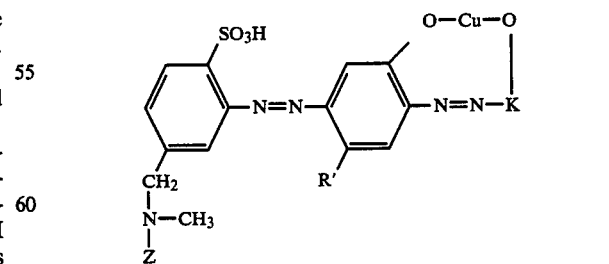

wherein
R' denotes H or CH$_3$ and
Z and K have the meaning given in claim 1.

3. Copper complexes of disazo dyestuffs, of the formula

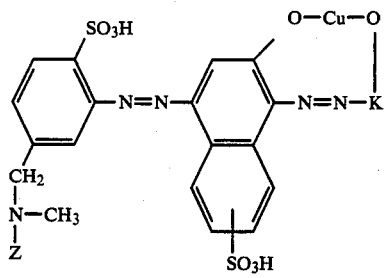

wherein Z and K have the meaning indicated in claim 1.

4. Dyestuffs of claim 1, 2 or 3, in which Z denotes 2-fluoro-5,6-dichloro-pyrimidin-4-yl, 2,6-difluoro-5-chloro-pyrimidin-4-yl, 2-fluoro-4-amino-triazin-4-yl, 2-fluoro-4-methylamino-triazin-4-yl, 2-fluoro-4-(2'-, 3'- or 4'-sulphophenylamino)-triazin-4-yl, 2-fluoro-4-(2'-methyl-4'- or -5'-sulphophenylamino)-triazin-4-yl, 2-fluoro-4-(2'-chloro-4'- or -5'-sulphophenylamino)-triazin-4-yl or 2-fluoro-4-(2'-sulpho-4'-methoxyphenylamino)-triazin-4-yl.

* * * * *

UNITED STATES PATENT AND TRADEMARK OFFICE
CERTIFICATE OF CORRECTION

PATENT NO. : 4,659,806

DATED : April 21, 1987

INVENTOR(S) : Horst Jäger

It is certified that error appears in the above-identified patent and that said Letters Patent is hereby corrected as shown below:

| | |
|---|---|
| Title Page, under "U.S. Patent Documents" | Lines 1 and 3 delete "Jager" and substitute --Jäger--; Line 2 delete "Schundehutte" and substitute --Schündehütte-- |
| Abstract, line 2 and Col. 1, line 15 | Delete bottom right of formula and substitute  |
| Col. 2, line 48 | After "dichloropyrimidine-" insert --4-carbonyl, 2,4-dichloropyrimidine- -- |
| Col. 3, line 19 | After "chloropyrimidin-" delete "b" |
| Col. 3, line 36 | Delete "cooperating" and substitute --coppering-- |
| Col. 3, line 40 | Correct spelling of --sulphonaphthalene-- |
| Col. 4, line 17 | Correct spelling of --methylaminotriazin-- |
| Col. 4, line 20 | After "4" first instance, insert -- - -- |
| Col. 4, line 33 | Delete bottom right of formula and substitute  |

UNITED STATES PATENT AND TRADEMARK OFFICE
CERTIFICATE OF CORRECTION

PATENT NO. : 4,659,806
DATED : April 21, 1987
INVENTOR(S) : Horst Jäger

It is certified that error appears in the above-identified patent and that said Letters Patent is hereby corrected as shown below:

| | |
|---|---|
| Col. 4, line 60 | Correct spelling of --hydroxyethylaminotriazine-- |
| Col. 4, line 61 | After "dichloro-4-(" insert --o-,m- or p-sulphophenyl)-aminotriazine and 2,6-dichloro-4- -- |
| Col. 4, line 61 | Delete "2',3+" and substitute --2',3'-- |
| Col. 5, line 25 | Correct spelling of --triazine-- |
| Col. 5, line 54 | Delete "cjloro" and substitute --chloro-- |
| Col. 10, line 7 | Delete "blud" and substitute --blue-- |
| Col. 12, line 46 | Correct spelling of --naphthalenesulphonic-- |

Signed and Sealed this

Ninth Day of February, 1988

Attest:

DONALD J. QUIGG

Attesting Officer

Commissioner of Patents and Trademarks